United States Patent [19]

Flanders

[11] 4,127,636
[45] * Nov. 28, 1978

[54] PROCESS FOR MAKING A REINFORCED BOARD MADE FROM LIGNOCELLULOSIC PARTICLES

[76] Inventor: Robert D. Flanders, Rte. 2, Box 666, #42, Wilsonville, Oreg. 97070

[ * ] Notice: The portion of the term of this patent subsequent to Nov. 15, 1994, has been disclaimed.

[21] Appl. No.: 793,121

[22] Filed: May 2, 1977

Related U.S. Application Data

[63] Continuation of Ser. No. 528,705, Dec. 2, 1974, Pat. No. 4,058,580.

[51] Int. Cl.² .............................................. B29J 5/00
[52] U.S. Cl. ..................................... 264/113; 264/271
[58] Field of Search .............................. 264/113, 271

[56] References Cited

U.S. PATENT DOCUMENTS

| | | | |
|---|---|---|---|
| 2,624,079 | 1/1953 | Duvall | 264/113 |
| 2,847,733 | 8/1953 | Roy | 428/326 |
| 3,890,077 | 6/1975 | Holman | 425/111 |
| 3,895,162 | 7/1975 | Lemont et al. | 264/229 |

*Primary Examiner*—Robert F. White
*Assistant Examiner*—James R. Hall

*Attorney, Agent, or Firm*—Chernoff & Vilhauer

[57] ABSTRACT

A reinforced board manufacturing process whereby a compressed uniform mixture of comminuted lignocellulosic particles, binder and other additives has a plurality of elongate reinforcing filaments having substantially greater tensile strength and modulus of elasticity than the mixture, embedded therein and bound to the particles by the binder. For some board applications, the reinforcing filaments comprise a plurality of short filaments, exemplarily glass fibers or steel wires, of about one-quarter to one and one-half inches in length distributed uniformly throughout the particle and binder mixture in a random orientation so as to extend generally in all directions. For board applications having greater flexural strength and stiffness requirements, the reinforcing filaments comprise a series of long filaments specifically oriented straightly in a predetermined direction corresponding to the direction of expected tensile stress and in a parallel arrangement spaced transversely from one another. The distribution of such long filaments is normally not uniform throughout the board, but rather concentrated in certain areas where greatest flexural strength and stiffness is needed. A combination of short and long reinforcing filaments embedded in the board is preferred for many applications.

1 Claim, 9 Drawing Figures

PROCESS FOR MAKING A REINFORCED BOARD MADE FROM LIGNOCELLULOSIC PARTICLES

This is a continuation, of application Ser. No. 528,705, filed 12/2/74, now U.S. Pat. No. 4,058,580.

BACKGROUND OF THE INVENTION

This invention relates to improvements in the manufacture of board products from comminuted lignocellulosic materials and adhesive binders and, more particularly, to the manufacture of such boards having substantially greater flexural strength, stiffness, fastener-holding properties and resistance to splitting than has heretofore been obtainable.

At present, boards made from wood and other lignocellulosic particles with appropriate thermosetting, thermoplastic or, in some cases, two-polymer organic binders have been manufactured as panels or in other shapes for limited applications in which no substantial flexural strength requirements exist. The restriction of the use of wood particle board to such limited applications results from the fact that the tensile strength and stiffness of wood particle board is much less than that of lumber, and thus presents a very poor resistance to flexural or bending stresses normally encountered in structural or framing members such as beams, decking or panels. No suitable remedy to the low tensile strength and stiffness of wood particle board has been discovered to date which can raise the tensile strength and elastic modulus (i.e. Young's modulus) sufficiently to enable the board to resist such flexural loading without rupture or undue deformation and at the same time retain the economy of the board necessary to enable its use as a practical lumber substitute in applications requiring flexural strength.

A further characteristic of present wood particle boards which discourages attempts to use them in applications necessitating high resistance to tensile stress is their questionable nail or screw holding capability under stress conditions. The lack of strong internal integrity of conventional particle board products may result in splitting around screws and nails or, at best, a limited ability to retain the nails or screws tightly throughout extended stress application. Such limited capability of conventional particle board to be fastened as a portion of a stressed structure, and remain securely fastened over an extended period of time, can be as much a disadvantage in such applications as the board's inherent lack of tensile strength.

While the use of certain reinforcing materials such as wire meshes, expanded metal and the like in wood particle board has been proposed from time to time as a solution to the foregoing problems, such schemes provide neither the tensile strength nor the fastening capability needed to render such boards acceptable as lumber substitutes in flexural stress applications.

SUMMARY OF THE PRESENT INVENTION

The present invention, directed to a method for making a reinforced board from lignocellulosic particles, overcomes the foregoing limiting deficiencies of prior art wood particle boards by providing inexpensive, yet highly effective, reinforcement for the boards. The reinforcement is of two different but related types, each being adaptable for utilization alone or in combination with the other.

One type of reinforcement comprises a plurality of "short" reinforcing filaments, defined for purposes of this application as being in the range of about one-quarter to about one and one-half inches in length, distributed uniformly throughout the lignocellulosic particle and binder mixture and randomly oriented so as to extend in all directions. Such filaments are embedded in the particle and binder mixture during the manufacturing process prior to compressing the mixture, and become bound throughout their length to the lignocellulosic particles by the binder when it is set. The short filaments preferably comprise elongate glass or steel fibers having a tensile strength and modulus of elasticity far in excess of those of the lignocellulosic particle and binder mixture and constituting between about five and twenty-five percent by volume of the uncompressed mixture. Glass or steel fibers are very inexpensive components relative to the strength they provide. Alternatively, shredded metal derived from tin cans or other waste metal can be used as an even less expensive short reinforcing material. The beneficial advantage of the randomly oriented short reinforcing filaments is threefold. First, an elevated degree of flexural strength and stiffness in all directions is introduced into the product by the binding of the filaments to the comminuted particles, the degree of flexural strength and stiffness increasing with increased length of the filaments. Second, the internal integrity of the board is greatly increased, thereby helping to prevent separation of the board due to compressive loads. And third, there is a substantial reduction in the tendency of even very thin pieces of the board to split when fasteners such as nails or screws are driven into the board, and a marked increase in the ability of the board to hold and retain such fasteners under stress conditions.

The other type of reinforcement comprises a plurality of much longer reinforcing filaments, also having a higher strength and modulus of elasticity than the particle and binder mixture, which are embedded and bound within the mixture and are specifically oriented in parallel in a predetermined direction or in multiple predetermined directions in which tensile stress is expected to occur. It is significant that these long reinforcing filaments are very long and extend continuously substantially between opposing lateral surfaces of the board, and that they are oriented substantially straightly, without undulations or bends of substantial amplitude and number such as the regular periodic undulations typical of woven or mesh materials which have in the past been used for reinforcing purposes. Like the short filaments, these long reinforcing filaments bound throughout their entire length to the lignocellulosic particles cause tensile stresses to be transferred from the particle and binder mixture to the filaments, which preferably have a very high tensile strength on the order of at least a hundred thousand p.s.i. and a modulus of elasticity of at least several million p.s.i. capable of resisting the flexural load levels encountered in structural members. In order to take advantage of the filaments' high tensile strength and modulus of elasticity, the tensile stress which would otherwise act to deform and possibly rupture the particle and binder mixture must be transferred through shear stress in the binder to the reinforcing filaments along their length. The longer the filaments the less is the shear stress in the binder for any given loading due to the greater shear area over which the load is distributed. Thus the longer the filaments the greater is the ability of the binder to transfer the flexural loading to them without rupture of the binder. Equally important, the long continuous length of the filaments is needed to prevent localized deformation and stress concentration which would otherwise occur under high load between adjacent aligned filament pieces if the filaments were discontinuous, thereby causing rupture of the particle-binder mixture at such locations.

The other highly important factor which has been found to affect the level of board strength obtainable is that the straighter the filaments the greater is their ability to accept the transfer of the tensile stress. By way of explanation, if the long filaments were not substantially straight their first reaction to the transfer of tension would be to straighten, thereby imposing the greater load on the particle mixture and at least partially defeating the purpose of the reinforcement. Accordingly, because of their substantial length, straightness, and specific orientation in the direction of expected load, this latter type of "long" reinforcement makes the board particularly adaptable for use as a beam, column, diaphragm-loaded panel or other structural member in which high flexural stress levels are anticipated.

The employment of short reinforcing filaments alone, without the benefit of long reinforcing filaments, provides a board with increased tensile strength and stiffness and strong internal integrity useful as an improved substitute for plywood panels, patterned boards for decorative purposes, hard board sheets, concrete form material, furniture material and other applications where an exceptionally high level of resistance to flexural stress is not a requirement. On the other hand, the employment of specifically oriented long reinforcing filaments alone provides a board having an extremely high resistance to flexural stress useful for many structural purposes as described above where, because of the application or type of fastener employed, high nail or screw-holding capability and a high resistance to splitting are not required. When no short filaments are employed, however, some additional long filaments transversely interconnecting the principal parallel long filaments should be provided if the application imposes compressive forces which might tend to separate the parallel long filaments. A combination of the two types of reinforcement in the same board fulfills all requirements.

Moreover it has been determined that the use of a molding process to prepare boards of predetermined irregular shape, having long reinforcing filaments extending therethrough in a non-uniform distribution specifically related to such shape, can produce an extremely stress-resistant board having a minimum of weight and containing a minimum quantity of lignocellulosic particles and binder. In particular it has been found that forming such boards with elongate protrusions extending along certain surfaces in the direction of expected stress and concentrating long reinforcing filaments within and parallel to such protrusions provides boards of very high flexural strength and stiffness without nearly as much weight or material as conventional particle boards of much lesser strength. A particularly advantageous irregular configuration for boards of this type is a waffle configuration suitable for panels for such uses as roof decking, walls, floor decking, hatch covers, specially shaped and formed products and other products for which plywood or particle board are normally used. Such waffle configuration features the long filaments concentrated and extending longitudinally through the ridges in the waffle pattern. Another irregularly shaped board of the type contemplated for use with long reinforcing filaments is an elongate board having a generally I-shaped cross-section, with the long filaments concentrated primarily in the upper and lower flange sections of the "I". Such a member, or a member of elongate rectangular cross-section having a concentration of long reinforcing elements near the edge surfaces, is highly adaptable as a general purpose beam. In addition, molded elongate board members of generally tubular cross-section having long filaments distributed longitudinally around the walls of the tube also provide good resistance to flexural stress while minimizing the amount of weight and material required, and are adaptable for a multitude of applications where the axis of bending moments varies, such as in a telephone pole which must resist wind forces applied in any direction.

The long reinforcing filaments may be pretensioned or not as desired, in accordance with the intended application. Although the binder will generally adhere the lignocellulosic particles to the filaments throughout their entire length strongly enough for most applications, precoating of the filaments with binder, or a binder component such as hardener, before the filaments are embedded in the mixture increases the strength of the bond while at the same time decreasing the relative amount of binder in the particle-binder mixture necessary to obtain a properly bonded product.

The foregoing and other objectives, features and advantages of the present invention will be more readily understood upon consideration of the following detailed description of the invention taken in conjunction with the accompanying drawings.

DETAILED DESCRIPTION OF THE INVENTION

Short Reinforcing Filaments

Figure 1:
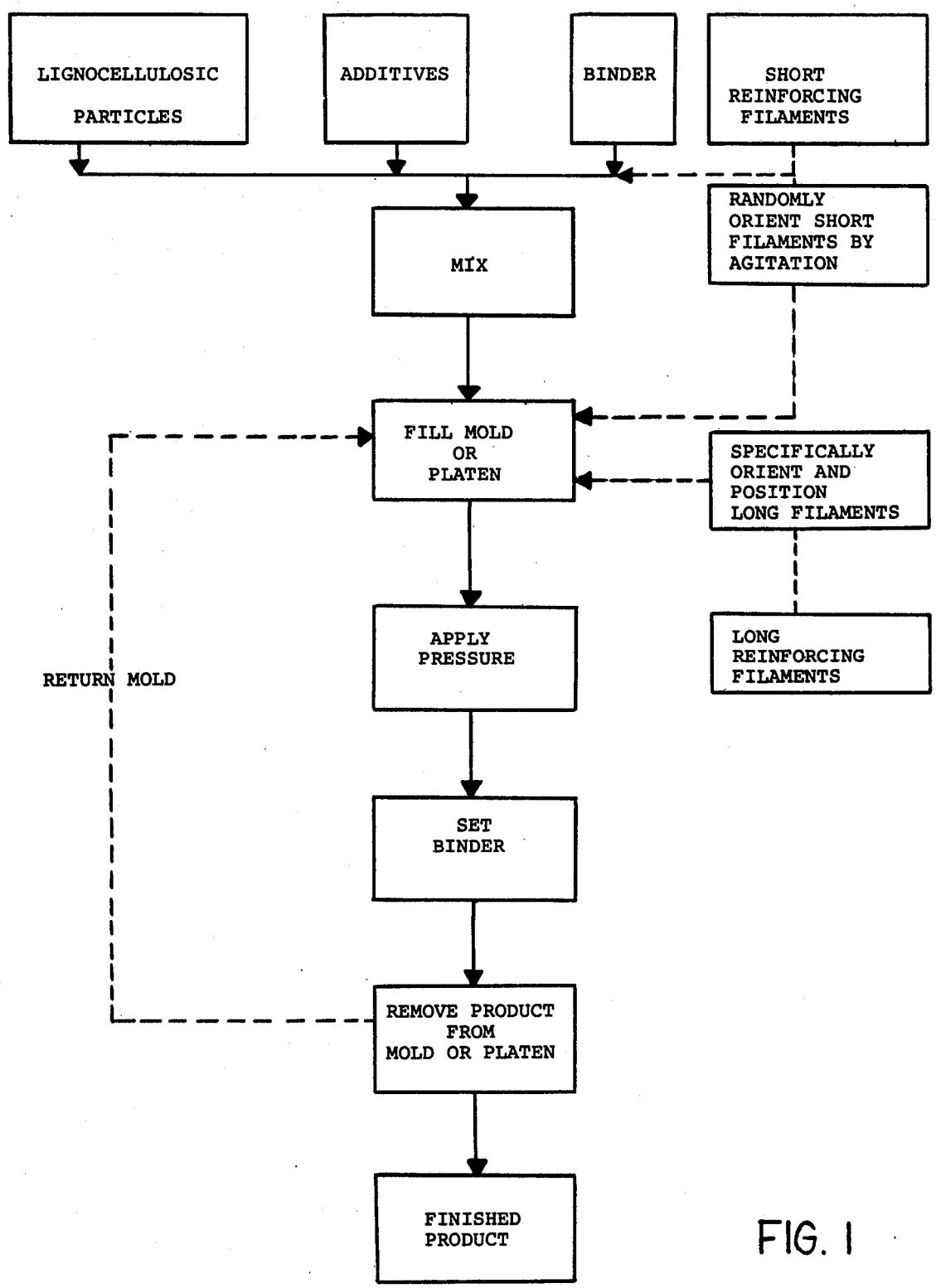
FIG. 1 is a schematic flow diagram of a typical process for manufacturing reinforced boards in accordance with the present invention.

With reference to FIG. 1, the method of manufacturing the reinforced board product of the invention comprises combining comminuted lignocellulosic particles, a suitable binder and, if desired, certain conventional additives for resistance to fire, moisture or insects, into a uniform mixture and depositing the resulting mixture as a layer or "mat" on a supporting surface, e.g. a supporting platen or the bottom of a mold. For manufacturing a board of the type containing "short" reinforcing filaments, a quantity of such filaments having a length in the range of about one-quarter to one and one-half inches is either mixed with the particles, binder and additives and deposited therewith on the supporting surface or deposited on the supporting surface from a separate source simultaneously with the other materials so that such short filaments are distributed uniformly throughout the mixture layer. Random orientation of the short filaments so that they extend generally in all lateral and vertical directions throughout the mixture can be achieved by mechanical mixing of the filaments with the particles, binder and additives prior to their deposit on the supporting surface or alternatively, if the short filaments are deposited from a separate source simultaneously with the deposit of the other materials, through agitation of the short filaments with air jets or mechanical agitating apparatus as they are being distributed. As an additional step the filaments may be precoated with the binder or a binder component such as hardener, preferably in liquid form, by spraying, dipping or mixing the filaments with such binder prior to being introduced into the mixture of particles, binder and additives so as to enhance the ultimate strength of the bond between the filaments and the lignocellulosic particles while reducing the relative amount and cost of binder which must be employed in the mixture as explained hereafter.

The lignocellulosic particles utilized are preferably woody particles such as sawdust, bark, shavings and chips, but the process and resultant product can also employ any fibrous lignocellulosic matter including but not limited to all softwoods and hardwoods, bagasse, straw, rice hulls, corn stocks, reeds, vegetable stems, cork, etc. either alone or in mixture with one or more other types of lignocellulosic material.

The binder employed may be virtually any organic resin binder of the type conventionally used in the particle board industry of either the thermoplastic, themosetting or two-polymer type, the only requirement being that it be capable of adhering both to the lignocellulosic particles and to the particular type of reinforced filament employed. Animal, vegetable and other adhesives meeting such requirement are also acceptable.

The additives used, if any, may comprise such compositions as wax for moisture resistance, creosote for preservation, borax compounds for fire prevention, etc. as desired, each in a manner and amount well-known to the art.

The reinforcing filaments employed may be any of various materials capable of being formed as elongate thin members and having a substantially higher tensile strength, and modulus of elasticity than the ultimate bonded particle and binder mixture, such tensile strength being substantially greater than that of the particles themselves and preferably in excess of 100,000 p.s.i. Thin glass fibers or steel wires are preferred because of their strong adherability to the binders, their economy, and the ease with which they may be cut. Other possible filament materials include shredded waste metal, cellulose fibers such as rayon, or synthetic organic fibers such as nylon, polyester, etc. The filaments may be single unitary fibers, or assemblies of fibers joined together by such means as winding, weaving or adhesion. For purposes of this application, the word "filament" includes collectively both single fibers and assemblies of fibers joined together in some manner.

In order to insure adequate resistance to shear in the binder which adheres the filaments throughout their length to the lignocellulosic particles and acts to transfer stresses from the particles to the filaments, the filaments should have a length-to-diameter ratio of at least 50. As used herein, the term "length-to-diameter ratio" when applied to filaments of other than round cross-sections contemplates that the "diameter" is equal approximately to the square root of the cross-sectional area of the filament. The reinforcing filaments should comprise from about 5 to about 25 percent by volume of the uncompressed mixture of lignocellulosic particles, binder, additives and short filaments which afre initially deposited in uncompressed condition on the supporting surface of the platen or mold. Ideally the short reinforcing filaments comprise about 15 percent of such mixture by volume. Such distribution of short filaments ultimately leads to a compressed board product having a short filament content from about 8 to about 35 percent by volume of the board, depending upon the degree of compression utilized in the board manufacturing process. If glass fibers are utilized as the reinforcing filaments, their surfaces are preferably preconditioned or "treated" in the conventional manner so that the binder will more strongly adhere to them.

A particular characteristic of the mixture of lignocellulosic particles, binder and additives through which the short reinforcing filaments are distributed is that, without precoating of the filaments with binder, there is a substantially higher ratio of binder to particle content than is usual in conventional particle board manufacture. Thus, whereas with conventional particle board the ratio is normally one part or less of binder to ten parts of lignocellulosic particles by weight, with the present invention the ratio is ideally between about two and six parts of binder to ten parts of particles by weight. This insures the all-important strength of the bond between the reinforcing filaments and the particles, which upgrades the tensile strength of the resultant product markedly and adapts it for the new described applications.

However, if the filaments are precoated with binder (or with a binder component) prior to distributing or embedding the filaments in the mixture of lignocellulosic particles and binder, then the effect is to concentrate sufficient binder around the filaments where it is most needed without necessitating the same high concentration of binder elsewhere in the mixture. The localization of binder concentration around the filaments which results from such precoating thereby saves the expense of providing an identical high concentration of binder between the lignocellulosic particles where it is not necessary, and can reduce the binder-to-particle content to approximately the same range as for conventional particle board. Such precoating also serves to enhance the ultimate strength of the bond between the filaments and the particles.

After the mixture is placed on the supporting surface of the platen or mold, sufficient pressure, in the range of about 400–4000 p.s.i. depending on the application and density required, is applied to reduce the volume of the mixture by about 40 to 85 percent. Thereafter, preferably with pressure applied, the binder is caused to set thereby binding the lignocellulosic particles to one another and to the short reinforcing filaments. The setting is accomplished in any of a number of different ways, depending upon the type of binder employed. For thermosetting binders a sufficient temperature, usually about 350°–425° F., is applied for a predetermined period of time dependent upon the thickness of the compressed mixture to cure and set the binder. For thermoplastic binders, such heat is applied at a suitable temperature and for a suitable time to plasticize the binder, after which it is set by cooling. For certain cold setting binders or catalytically hardenable binders, the application of heat is not required. Heat application, if required, can be by any number of possible means. The press may be a heated platen press, or the mold may be heated by steam or other high temperature heat transfer fluid, by electric cartridge heaters embedded in the mold walls, or by microwave or "RF" application.

After setting of the binder and cooling of the product, the product is removed from the mold or platen and, if necessary, sawed into pieces of desired shape and size. If molds are used, they are returned to the filling station.

Long Reinforcing Filaments

For manufacturing boards of extremely high tensile strength for use as structural members, beams, panels and so forth, long reinforcing filaments are embedded in the above-described mixture layer which is deposited on the supporting surface of the platen or mold. The mixture may be or may not include the uniformly distributed, randomly oriented "short" reinforcing filaments, depending upon the characteristics required for the ultimate product as discussed previously.

The long reinforcing filaments utilized should be generally of the same high tensile strength and modulus of elasticity as the short reinforcing filaments previously described, the primary differences being as follows:

(1) The long reinforcing filaments have a much greater length than the short filaments; if used in a product also containing short filaments, the long filaments preferably have a length-to-diameter ratio at least ten times greater than that of the short filaments.

(2) The long filaments are specifically oriented parallel to one another in a predetermined direction or multiple directions corresponding to the expected direction or directions of tensile stress, as opposed to the random orientation of the short filaments in all directions.

(3) The long filaments are oriented substantially straightly throughout the paticle and binder mixture and throughout the resultant board product, without undulations, curves or bends of substantial amplitude and number; conversely the short filaments are not necessarily straight due to the compression of the mixture which tends to crimp or fold at least some of the randomly oriented short filaments.

(4) Although the long filaments may be uniformly distributed throughout the mixture and resultant product, they preferably are concentrated in those locations where they will have the greatest effect in supplying the needed flexural strength; for boards of regular cross-section the long filaments accordingly are preferably concentrated near the surfaces rather than the center of the board; moreover, for the best strength-to-weight relationship, it is desirable to mold the boards into elongate members of irregular cross-section and to orient and position the long filaments in a predetermined manner with respect to the irregular cross-section.

The embedding of long reinforcing filaments into the mixture of lignocellulosic particles and binder, can be performed in any number of different ways to achieve the proper orientation, positioning and straightness of the long filaments. One practical method is to deposit the mixture on the supporting surface of the mold or platen in incremental layers atop one another. Between successive deposits of incremental layers, the long reinforcing filaments are layed atop the previous layer straightly and in the desired orientation. For the strongest bond between the filaments and particles, and the least required amount of binder, the long filaments may be precoated with binder as discussed previously. In order to insure the capability of the board for transferring tensile stresses from the lignocellulosic particles to the long filaments, it is important that the long filaments have a continuous length great enough to extend substantially between the lateral edges of the mixture layer in the particular direction selected, such lateral edges being those edges which define the length and width (as opposed to the thickness) of the board product resulting from the compression of the mat. To further enhance the capability of the board to transfer the tensile stresses to the long filaments, the filaments may additionally be formed with certain lateral protrusions thereon, such as by upsetting a steel filament at certain locations along its length.

A highly practical method of introducing the long filaments to the mixture is to draw the filaments from spools in a parallel arrangement and employ a mechanical cutter to cut them to size and position them. If desired, the parallel arrangement of long filaments may be in the form of a web which automatically holds the long filaments in the desired parallel spaced configuration. If the apertures in the web are small enough, the succeeding mixture layer can, if desired, be supported by the web and the two laid on the previous mixture layer simultaneously. A web having rectangular apertures is particularly useful for manufacturing those boards where orientation of long reinforcing filaments in multiple directions at right angles to one another is required because of multidirectional tensile stresses, or where short reinforcing filaments are not employed and transverse connection between parallel long filaments is needed to prevent separation of the filaments due to compressive stress. For certain product applications, it may also be desirable to pre-tension the long reinforcing filaments prior to setting the binder until the binder is actually set, particularly where the resultant board is expected to span a substantial distance.

After the mixture layer, with the long reinforcing filaments embedded therein, has been built to the required mass, compression applied in a direction always perpendicular to the long filaments, so as to preserve straightness as much as possible. Such compression results in a substantially straight filament in the finished product, i.e. a filament having no more than minor undulations of much greater length than amplitude which allow no substantial degree of longitudinal stretching of the filament upon the application of tension. The binder is set thereby binding the lignocellulosic particles to one another and to the long reinforcing filaments throughout their length. Upon setting of the binder, the board product is removed and used or cut as desired.

Figure 2:
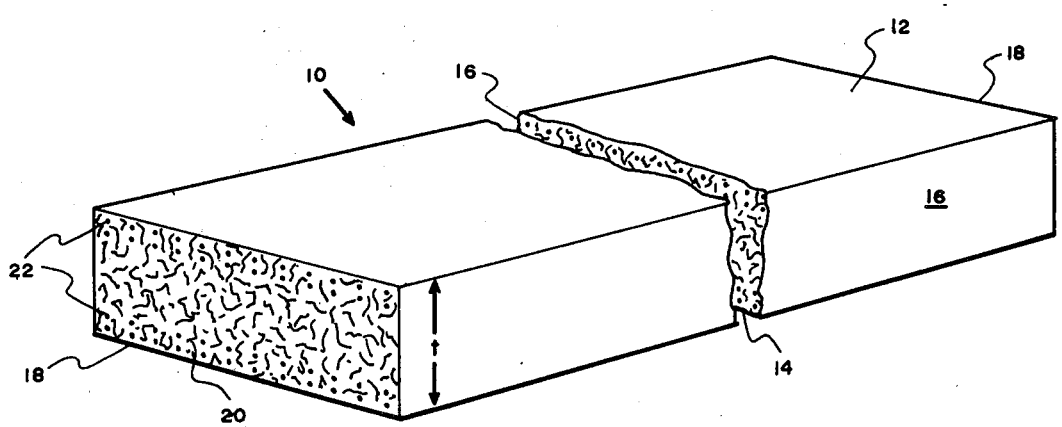
FIG. 2 depicts a plank of regular cross-sectional shape having both long and short reinforcing filaments embedded therein in accordance with the present invention.

FIG. 2 depicts an elongate board 10 of regular rectangular cross-section prepared with both long and short reinforcing filaments in accordance with the present invention. As shown, the board 10 is particularly useful as a plank having a thickness "t", top and bottom surfaces 12 and 14 respectively, and lateral edges comprising elongate side edges 16 and end edges 18. Short reinforcing filaments 20 are distributed uniformly throughout the board 10 in a random orientation extending in all directions. Long reinforcing filaments 22 extend longitudinally in spaced, parallel arrangement throughout the board, extending substantially continuously between the end edges 18. The direction of the long filaments is determined by the fact that the board 10, if used as a plank with vertical loads applied to its top surface 12, will experience its greatest flexural stresses in the direction of such long filaments. The long filaments 22 are preferably concentrated adjacent the upper and lower surfaces 12 and 14 respectively of the plank. If the plank is utilized with a load applied to the top surface 12, the need for tensile strength and stiffness will be greatest adjacent the bottom surface 14. If the plank 10 is inverted so that surface 12 becomes the bottom surface, then the greatest need for tensile strength and stiffness will be adjacent the surface 12. Thus the board 10, with the long reinforcing filaments 22 oriented straightly and longitudinally of the board and concentrated adjacent the upper and lower surfaces, anticipates the use of such board as a plank with either surface 12 or 14 up. Providing long filaments adjacent the center of the plank, while doing no harm, serves no particular purpose since the tensile stress at that location is minimal or non-existent.

Figure 3:
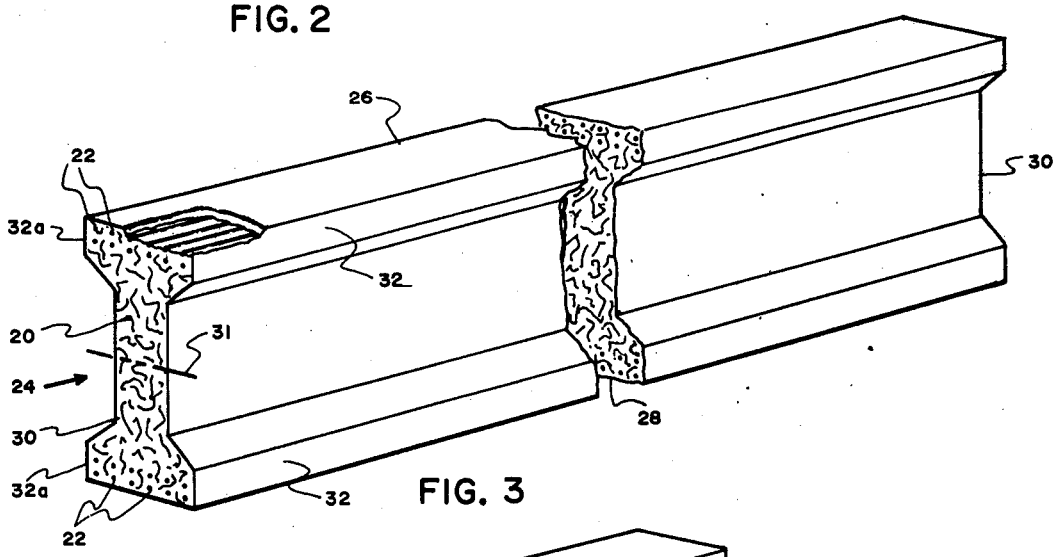
FIG. 3 depicts a beam of I-beam cross-section having short filaments and having long filaments concentrated in the upper and lower flange portions of the beam.

FIG. 3 depicts an elongate board 24 having an I-beam shaped cross-section and having short filaments 20 and long filaments 22 embedded therein. The board 24 is intended primarily as a beam wherein vertical forces will be imposed on its upper surface 26 or lower surface 28, depending upon which way the beam is installed. In this case the long reinforcing filaments 22 extend continuously substantially between the end edges 30 of the board 24, and are more concentrated within the protrusions 32, 32a of the board and within those portions which extend perpendicularly inwardly from the protrusions than in the remaining portions of the board. The effect is to provide a large number of long reinforcing filaments in those portions of the board adjacent the top and bottom surfaces 26, 28 as far as possible from the neutral bending axis 31 of the beam, such top or bottom portion being where the greatest tensile stress and deformation is expected when beam loading occurs, while minimizing the quantity of lignocellulosic particles and binder nearer to the neutral axis 31 where little stress is to be expected, thereby significantly lessening both the weight and expense of the board and maximizing its strength-to-weight ratio. Since the board 24 is of irregular cross-section, such board is preferably prepared in a mold with a bottom supporting surface having two elongate depressions at its longitudinal edges so as to form the elongate protrusions 32 of the board. The mold has a cover plate, to be inserted over the mixture and compressed thereon, which also includes two elongate depressions for forming protrusions 32a on the opposite side of the board. Proper orientation and concentration of the long filaments 22 is accomplished during manufacture of the board preferably by laying the particle and binder mixture in incremental layers, as described previously. Accordingly a thin layer of mixture is distributed within the elongate depressions of the supporting surface of the mold and the first set of long filaments is laid longitudinally within the depressions. This is followed by another incremental layer of mixture and another set of parallel reinforcing filaments 22, the placement of such filaments being localized to the depressions or the area directly above the depressions, and so forth until the mixture is built to the desired height. Ultimately the cover plate forming the opposite irregular side of the board is pressed into position, the binder is set and the reinforced board is removed from the mold.

Figure 4:
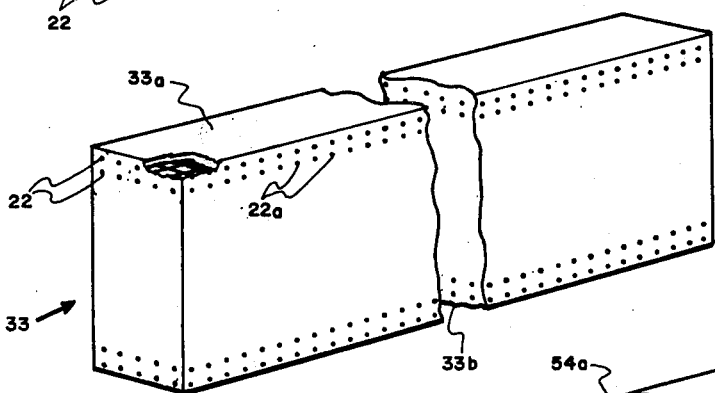
FIG. 4 depicts a beam of regular rectangular cross-section having long filaments but no short filaments embedded therein.

FIG. 4 depicts an elongate beam 33 of regular rectangular cross-section having long filaments 22 embedded therein without any short filaments. Like the product of FIG. 3, it is intended that vertical forces will be imposed on the upper surface 33a or lower surface 33b, depending upon which way the beam is installed. Again the long reinforcing filaments are concentrated in the upper and lower portions of the beam where the greatest deformation and stress is expected when beam loading occurs. Since there are no short filaments to provide added internal integrity of the board, as in the embodiment of FIG. 3, the long filaments 22 are transversely connected to one another by other long filaments 22a extending at right angles to filaments 22 so as to form a web having rectangular apertures. Accordingly, when the top portion of the board experiences longitudinal compression due to beam loading while the bottom portion experiences tension, the transverse filaments 22a help prevent the top portion from spreading transversely and failing in compression. Alternatively the use of short filaments would also accomplish this purpose. The beam 33 is preferably manufactured in a mold by the incremental layer method previously described, building from the bottom surface 33b to the top surface 33a and then applying compression against the top surface. The pre-orientation of the filaments in the form of a web facilitates their proper orientation during the manufacturing process.

Figure 5:
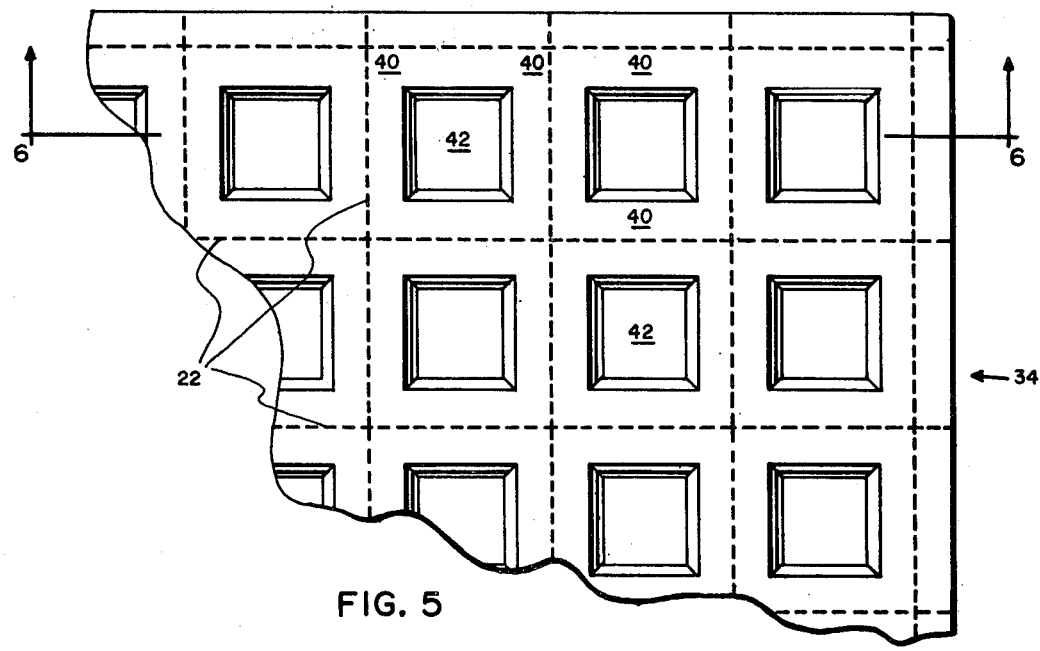
FIG. 5 is a top view of a panel having a waffle configuration on one side thereof showing the specific placement of the long reinforcing filaments in relation to the waffle pattern.
Figure 6:
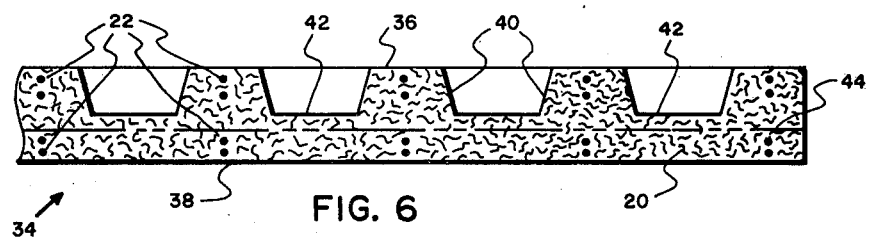
FIG. 6 is a sectional view of the waffle panel of FIG. 4 taken along line 6—6 of FIG. 4.

FIGS. 5 and 6 depict another type of molded board 34 having an irregular cross-section and having short reinforcing filaments 20 and long reinforcing filaments 22 embedded therein in accordance with the present invention. In this case the principal intended use of the board is as a panel for use as walls, roof decking, floor decking, etc. where loading normal to the upper surface 36 or lower surface 38 of the board is expected. Since such loading introduces tensile stresses in more than a single lateral direction, the long reinforcing elements 22 are embedded in the board 34 in parallel groups which run at right angles to one another so that the board has high resistance to flexural stress along both of its principal lateral axes. Moreover the long filaments 22 are again preferably concentrated adjacent the surfaces 36, 38 where greatest tensile stress is expected to occur. Finally, to reduce the weight and cost of the panel 34 and maximize its strength-to-weight ratio, one side of it is formed with a waffle configuration having a plurality of elongate protrusions 40 arranged in two parallel sets which cross each other at right angles leaving square-shaped indentations 42 distributed uniformly over the surface 36 of the panel 34. Like the I-beam configuration of FIG. 3, the long reinforcing filaments 22 are more heavily concentrated in the protrusions 40 and in those portions of the panel which extend perpendicularly inwardly from the protrusions than in the other portions of the panel. Concentrating the long filaments 22 within the protrusions maximizes the distance between the filaments 22 and the neutral bending axis 44 of the panel and thereby maximizes the resistance of the board to bending. As shown in FIG. 4, the long filaments 22 follow parallel to and within the protrusions 40 and thereby form a grid corresponding to that of the waffle pattern. The manufacture of the waffled panel 34 may be carried out much the same as the previous boards, with either the bottom or top plate of a mold or platen having the waffle design formed thereon. The long filaments 22 are spaced and positioned as the mat layer is built up so as to fall within the depressions of the waffle plate which will ultimately form the protrusions 40 of the waffled surface. A rectilinear web of the long filaments 22 having the filaments spaced so as to correspond with the waffle pattern is a convenient reinforcing material for this particular board design.

Figure 7:
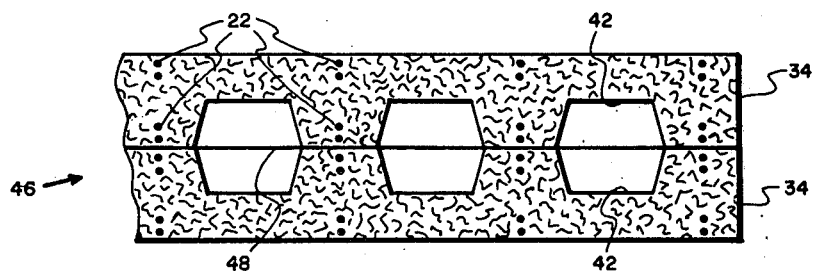
FIG. 7 depicts a panel of exceptional strength wherein the waffled surfaces of a pair of reinforced waffle panels are adhered to one another.

FIG. 7 depicts a panel 46 intended for exceptionally heavy loading composed of two panels 34 adhered to one another at their waffled faces by a suitable binder 48. Such panel 46, besides being capable of withstanding very large loads, also offers excellent insulation by virtue of the trapped air within the indentations 42.

Figure 8:
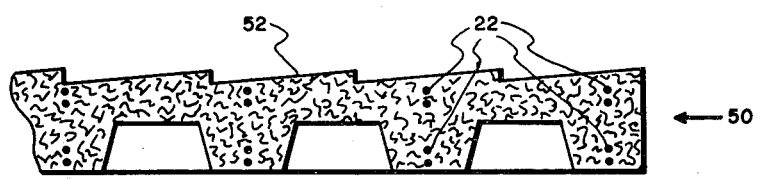
FIG. 8 is a sectional view of another embodiment of the waffle panel having a shingle-like surface on the side of the panel opposite the waffle configuration, for use as a roof panel.

FIG. 8 depicts a slightly modified waffled panel 50, usable alone or adhered to another panel 34, which as a simulated shingle or shake pattern molded into its upper surface 52 and usable as a one-piece prefabricated substitute for multiple elements of a conventional roof, including shingles, roof decking and even roof insulation. Other variations of the FIG. 7 embodiment include a siding pattern in place of the shingle-like pattern 52, so that the panel may be used as a one-piece prefabricated wall for a building. Such prefabricated building materials are preferably treated with fire, moisture and termite retarding agents during the manufacture of the board, as discussed earlier.

Figure 9:
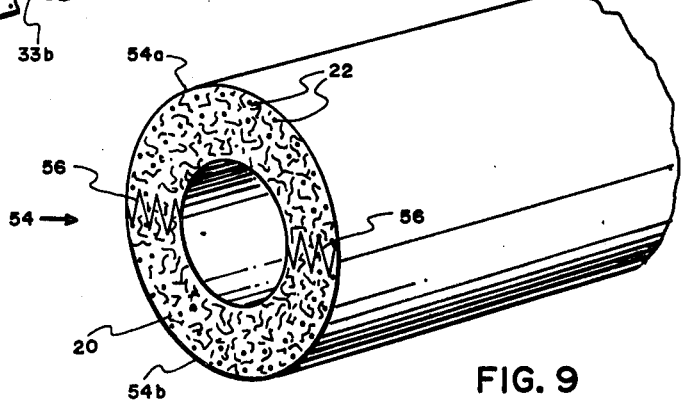
FIG. 9 depicts a board of annular cross-section construction of two half-annular members joined together and showing the placement of the long reinforcing filaments.

FIG. 9 depicts another type of board 54 having short reinforcing filaments 20 and long reinforcing filaments 22 embedded therein. In this case the board 54 is intended to be loaded as a beam where the direction of loading and plane of bending is variable. A particularly appropriate use for this type of board is as a telephone pole or similar pole where lateral wind loading may be applied from any direction, imposing bending moments along the length of the pole. The board 54 is of tubular cross-section, which may include an annular configuration as shown or such other tubular shapes as elliptical, triangular, rectangular and square. As with all of the other boards described, the long reinforcing filaments 22 extend continuously substantially between the ends of the board. The fact that the board is tubular automatically tends to concentrate the long reinforcing filaments toward the outer surfaces, where bending stress is expected to be the greatest, and minimizes the weight and cost of the material in the board. The board may be constructed of two half-tubular board members 54a and b respectively, formed in a mold having an arcuate or other surface corresponding to the desired tubular shape and joined together at molded interlocking surfaces 56 by adhesive. Alternatively the tubular board 54 may be formed as a unitary element by extrusion, or on a mandrel, or in a cored mold. The incremental layer approach of placing and orienting the long reinforcing filaments as the mixture layer is built up is a satisfactory method for molding the board.

The invention will now be illustrated, without intending any limitation thereof, by the following specific example.

EXAMPLE

Lignocellulosic particles composed of Douglas fir sawdust and bark dried to a moisture content of about 6 percent are placed in a mechanical mixer together with a quantity of binder composed of resorcinol/phenol adhesive and a monohydric phenolic resin hardener. To these ingredients is added a quantity of treated short fiberglass filaments having a length of about one-half inch, each such filament comprising an assembly of about 25 glass fibers each having a diameter of about one-thousandth of an inch. The resultant mixture comprises 60 percent sawdust and bark, 18 percent binder, and 22 percent short filaments by weight. On a volume basis, the ratios are approximately 84 percent sawdust and bark, 3 percent binder and 13 percent short filaments. The foregoing ingredients are thoroughly mixed by the mechanical mixer to a uniform consistency, and then deposited in incremental layers in an elongate mold having a regular rectangular interior shape for forming a plank. The first incremental layer is spread evenly on the bottom of the mold to a depth of about one-half to one inch. Thereafter treated along fiberglass filaments, of the same type as the short filaments but having a continuous length equal to the length of the mold, are laid straightly side-by-side in a spaced, parallel arrangement on the upper surface of the first incremental layer, the number of filaments depending on the strength level required. Thereafter a second layer of mixture approximately one-half to one inch thick is spread evenly atop the first set of long filaments, and thereafter a second set of long filaments is laid atop the second mixture layer in the same manner as the first. A layer of mixture approximately two to three inches thick is then spread, followed by more long filaments, a one-half to one inch mixture layer, another set of long filaments, and a final one-half to one inch mixture layer in that order. A cover plate is placed in the mold and pressure of 400 p.s.i. applied thereto by a hot press. While the pressure is applied, sufficient heat is applied to the mold by the press to cure the binder, after which the mold is cooled and disassembled and the product removed therefrom. The resultant product resembles the plank 10 of FIG. 2.

The terms, expressions and examples which have been employed in the foregoing abstract and specification are used therein for purposes of description and not limitation, and there is not intention of excluding equivalents of the features shown and described or portions thereof, it being recognized that the scope of the invention is defined and limited only by the claims which follow.

What is claimed is:

1. A process for making a reinforced particle board comprising:
 (a) placing on a generally horizontal supporting surface a uniform mixture of lignocellulosic particles and a settable adhesive binder as a first incremental layer having peripheral edges;
 (b) coating a plurality of elongate reinforcing filaments, each having a tensile strength which exceeds the tensile strength of the mixture of said lignocellulosic particles and said binder when said binder is set, each filament having a continuous length, with a quantity of settable adhesive binder;

(c) depositing atop said first incremental layer said plurality of coated reinforcing filaments;

(d) orienting said plurality of reinforcing filaments substantially straightly and in a predetermined, generally horizontal direction in side-by-side parallel relation to and transversely spaced from one another, said reinforcing filaments each having a sufficient continuous length to extend in said predetermined direction continuously substantially between the respective peripheral edges of said first incremental layer;

(e) depositing atop said reinforcing filaments a second incremental layer of said mixture coextensive with said first incremental layer;

(f) compressing said layers to a predetermined thickness by applying pressure thereto in a generally vertical direction; and (g) while said layers are so compressed, setting the binder therein to bind said lignocellulosic particles to one another and to said reinforcing filaments substantially throughout the continuous length of said filaments so as to form said reinforced board.

* * * * *

UNITED STATES PATENT AND TRADEMARK OFFICE
CERTIFICATE OF CORRECTION

PATENT NO. : 4,127,636
DATED : November 28, 1978
INVENTOR(S) : Robert D. Flanders It is certified that error appears in the above-identified patent and that said Letters Patent are hereby corrected as shown below:

Col. 3, line 16    Change "load" to --loading--.

Col. 6, line 24    Change "afre" to --are--.

Col. 7, line 58    Change "paticle" to --particle--.

Col. 8, line 61    After "compression" insert the word --is--.

Signed and Sealed this

Eighth Day of May 1979

[SEAL]

Attest:

RUTH C. MASON
Attesting Officer

DONALD W. BANNER
Commissioner of Patents and Trademarks